Dec. 8, 1964 H. MANN ETAL 3,160,740

RANDOM PULSE DISTRIBUTION INDICATOR

Filed July 11, 1958 3 Sheets-Sheet 1

INVENTORS H. MANN
A. E. RUPPEL
BY
Charles S. Phelan
ATTORNEY

Dec. 8, 1964 H. MANN ETAL 3,160,740
RANDOM PULSE DISTRIBUTION INDICATOR
Filed July 11, 1958 3 Sheets-Sheet 2

INVENTORS H. MANN
A. E. RUPPEL
BY
Charles S. Phelan
ATTORNEY

RANDOM PULSE DISTRIBUTION INDICATOR

Filed July 11, 1958

3 Sheets-Sheet 3

INVENTORS H. MANN A. E. RUPPEL

BY

Charles S. Phelan

ATTORNEY

United States Patent Office 3,160,740
Patented Dec. 8, 1964

3,160,740

RANDOM PULSE DISTRIBUTION INDICATOR

Henry Mann, Berkeley Heights, N.J., and Alfred E. Ruppel, East Rockaway, N.Y., assignors to Bell Telephone Laboratories, Incorporated, New York, N.Y., a corporation of New York Filed July 11, 1958, Ser. No. 747,875
15 Claims. (Cl. 235—92)

This invention relates to a pulse distribution indicator. More particularly, the invention relates to a device for counting pulses which occur during time intervals of controllable duration and for classifying the interval pulse counts according to the magnitudes thereof.

The invention will be described in connection with its application to a high speed data transmission system. However, it will be apparent that the usefulness thereof is not limited to such an application.

In a high speed data transmission system telegraphic mark and space signals are utilized to transmit information by means of electrical impulses traveling through a suitable transmission medium. In one system, the mark and space signals, or information bits, are transmitted at a rate which is of the order of magnitude of 1500 bits per second. This is considerably faster than the transmission rate in a conventional telegraphic transmission system in which information is transmitted at the rate of approximately 100 bits per second. Ordinary telegraph metallic transmission media are capable of transmitting only a relatively narrow band of frequencies so they are unsuitable for the transmission of the relatively broad band of frequencies required for the rapid signal variations in a high speed data transmission system. Therefore, radio, or selected and treated telephone message channels, must be utilized in order that the transmission medium may have suitable transmission characteristics to accommodate the relatively high speed signal variations. Conventional telephone message channels must be selected and treated to reduce the effects of noise and distortion that would be of no consequence to telephone message transmission or to ordinary telegraph transmissions, but which would introduce errors in a high speed data system.

In the prior art there are devices for determining the long time average error rate by detecting and counting the number of errors in a received data signal. However, it is often advantageous to have information which reveals the short time error distribution, i.e., information relating to the probability of the occurrence of a predetermined number of errors in short time intervals of different durations. This type of information is important to the evaluation of various error checking codes and parity systems. As an example of the utility of data indicating the short time distribution of errors, assume that a high speed data transmission system will use a simple parity checking code and that the data word lengths to be transmitted will be about 20 bits. If the short time distribution of errors indicates that there is a high likelihood of having multiple errors in 20-bit intervals, it is then likely that the simple parity checking code will fail to detect errors in a large number of cases. Therefore, it will be necessary to take some remedial steps such as changing the word length, adopting a different parity checking code, or perhaps treating the system to reduce noise and distortion.

Accordingly, it is one object of the invention to determine the distribution of pulses in time intervals of predetermined duration in a pulse train in which pulses may occur at random.

A further object is to measure the short time distribution of errors in a high speed data transmission system.

Another object is to count separately the number of time intervals during which predetermined numbers of pulses occur.

A more specific object of the invention is to determine in a data transmission system the number of intervals of predetermined duration in which more than one error occurs and to determine the specific distribution of such errors, i.e. the specific number of intervals containing specific numbers of errors.

A further specific object is to determine in a data transmission system the number of intervals containing errors in consecutive data bit periods and to determine the specific distribution of such errors, i.e. the specific numbers of intervals containing specific numbers of consecutive errors.

These and other objects of the invention are realized in an illustrative embodiment thereof in which a first random pulse initiates the examination of a time interval of predetermined duration which includes the initial random pulse. Binary counters total the random pulses occurring during each interval. A circuit, which is actuated by the initial random pulse in each interval, generates a readout pulse at the end of the interval to cause the binary count to be translated into a decimal count and stored in an appropriate decimal register. The readout pulse also actuates a circuit for resetting the binary counters to Zero. Additional circuits may be provided for initiating early readout after *n* random pulses have been counted in any one interval and, if desired, to initiate early readout at the end of a group of consecutive random pulses in any one interval.

A better understanding of the invention may be obtained from a consideration of the following description thereof in connection with the attached drawing in which.

Figures 1, 2:
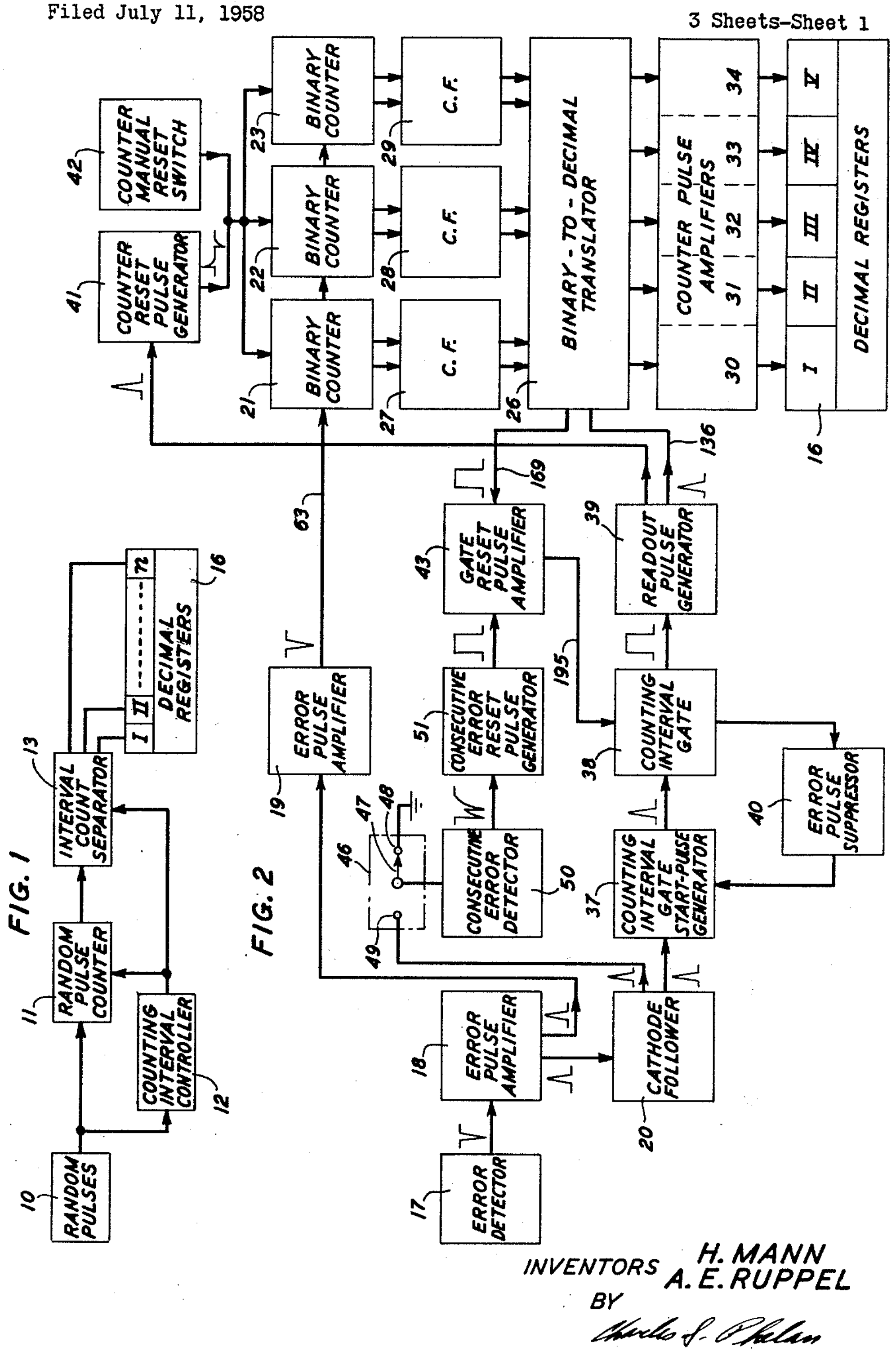
FIG. 1 is a simplified block and line diagram illustrating the invention.
FIG. 2 is a block and line diagram of an illustrative embodiment of the invention.

Referring to FIG. 1, a source 10 supplies to pulse counter 11 a pulse train in which the pulses may occur at random. A counting interval controller 12 is responsive to a first random pulse for controlling the duration of the interval during which the random pulses are counted. At the end of such interval a readout pulse is applied from controller 12 to an interval count separator 13 which is responsive to the magnitude of the count for actuating particular ones of the *n* decimal registers in the bank 16 of registers wherein are totalled the number of counting intervals during which random pulse counts of different magnitudes occurred. Readout pulses from controller 12 are also applied to the random pulse counter 11 to cause such counter to be reset to the zero count condition in preparation for the counting of random pulses occurring during subsequent time intervals.

Upon the completion of an interval during which a single random pulse occurred, interval count separator 13 actuates the decimal register I thereby indicating the occurrence of an event comprising an interval containing a single random pulse. If an interval includes two random pulses, separator 13 actuates decimal register II to indicate the occurrence of an event which includes two random pulses. Events which include $n$ random pulses would cause separator 13 to actuate decimal register $n$. After a predetermined measuring period has elapsed, decimal registers I through $n$ indicate the numbers of intervals, or events, during that period which included 1 through $n$ random pulses, respectively. For example, if at the time of reading, registers I, II . . . $n$ indicate 9, 4 . . . 2, it is then known that during the measuring period there were nine intervals of predetermined length containing one error, four intervals containing two errors, and two intervals containing $n$ errors. It will be observed from the subsequent description of the invention that interval count separator 13 actuates one only of the decimal registers in the bank 16 in response to each event.

Referring to FIG. 2, the source of random pulses is an error detector 17 which might be, for example, a matching and error counting circuit or a parity checking circuit in a high speed data transmission system (not shown). Pulses from error detector 17 are coupled via an error pulse amplifier 18 to the input of a further error pulse amplifier 19 and to the input of a cathode follower 20. Negative-going output pulses from amplifier 19 are applied to one input of a binary counter 21. Counter 21 is connected in cascade with two further binary counters 22 and 23 for counting error pulses in a bniary counting system. Any number $x$ of counters may be employed as may be necessary for the particular system under study, but three counters are utilized here for the purposes of illustration.

The outputs of each of the binary counters 21, 22, and 23 are coupled to a binary-to-decimal translator 26 via cathode follower circuits 27, 28, and 29. Translator 26 corresponds to the interval count separator 13 of FIG. 1, for it is in translator 26 that the binary count in counters 21 through 23 is translated into a decimal count and applied to an appropriate one of the decimal registers I through V in the decimal register bank 16 via counter pulse amplifiers 30 through 34, respectively. In this case, the number $n$, hereinbefore mentioned in connection with FIG. 1, is equal to five. Although three binary counters and five decimal registers are indicated in FIG. 2, it is understood, of course, that either more or less of these components could be utilized as may be necessary. The details of the counting and translating circuits will be hereinafter described in connection with FIG. 3.

The control of the duration of the intervals during which error pulses are counted is accomplished by circuits which are responsive to a first error pulse in the output of cathode follower 20. One output of cathode follower 20 is utilized to trigger counting interval gate start-pulse generator 37 wherein a sharp impulse is generated for actuating counting interval gate 38.

Gate 38 generates a rectangular output pulse of precise duration which is applied to a readout pulse generator 39 wherein a readout pulse is produced in response to the trailing edge of the rectangular pulse. The output of gate 38 is also coupled back to the input of start-pulse generator 37 via an error pulse suppressor 40. Suppressor 40 prevents the retriggering of start-pulse generator 37 in response to error pulses from cathode follower 20 for the duration of the rectangular output pulse from gate 38. The details of the arrangement and operation of counting interval gate 38 and its associated circuits will be hereinafter described in greater detail in connection with FIG. 4.

Readout pulses in the output of generator 39 are applied to translator 26 via lead 136 to initiate the readout therefrom to the bank 16 of decimal registers as will be hereinafter described in connection with FIG. 3. Readout pulses in the output of generator 39 are also applied to a counter reset pulse generator 41 which is responsive thereto for resetting binary counters 21 through 23 to the zero count condition. Generator 41 may comprise, for example, a monostable multivibrator having the output thereof differentiated so that the differentiated trailing edge of the multivibrator output wave may be utilized to reset counters 21 through 23 after the readout operation from translator 26 has been completed and before the end of the next succeeding bit interval.

A counter manual reset switch 42 is also indicated in FIG. 2 and may comprise, for example, any suitable bias source and switching means for manually applying a bias to counters 21 through 23 to reset them to a predetermined counting condition.

Translator 26 also includes a fifth error detecting circuit, as will be hereinafter described in connection with FIG. 3, for actuating a gate reset pulse amplifier 43 to trigger gate 38 back to its normal inactive condition before the expiration of the timed interval in response to the occurrence of the fifth error pulse in a given counting interval. This arrangement is necessary since only five registers are provided in FIG. 2 and it is therefore necessary to initiate readout and stop the action of binary counters 21 through 23 even though more errors might occur during the interval if it were permitted to continue for its natural timed duration. In the particular system with which the pulse distribution indicator of FIG. 2 is used, information which includes five or more errors in a given word interval is discarded. Therefore, for such a system it is only necessary to indicate separately those events having up to five errors per interval.

If it is desired to determine the distribution of errors occurring during consecutive bit intervals, as distinguished from errors which occur at any time during a counting interval, the mode of operation of the circuit of FIG. 2 may be modified. A single-pole-double-throw switch 46 is provided for connecting into the counting interval controlling circuits means for producing an output pulse in response to the occurrence of a bit interval which does not include an error following consecutively a bit interval which does include an error. Switch 46 includes an armature 47 and two contacts 48 and 49. When the pulse distribution indicator is operating in the interval timing mode, armature 47 contacts the grounded contact 48 as illustrated. When the indicator is to be converted to the consecutive error mode of operation, armature 47 is moved to contact 49 for coupling output pulses from cathode follower 20 to a consecutive error detector circuit 50.

The output of detector 50 is coupled to a consecutive error reset pulse generator 51 to produce an output pulse in response to the occurrence of a good bit interval following an eroneous bit interval, i.e., the termination of a series of consecutive pulses. The output of reset pulse generator 51 is applied to the input of reset pulse amplifier 43 to initiate an early readout, before the end of a normal timed counting interval, in the same manner hereinbefore described in connection with the actuation of amplifier 43 in response to the fifth error detecting circuit of translator 26.

Summarizing the operation of the pulse distribution indicator illustrated in FIG. 2, error pulses from detector 17 are applied via error pulse amplifiers 18 and 19 to the binary counters 21 through 23. The error pulses are also applied via cathode follower 20 to start pulse generator 37 to initiate the timing of a counting interval of a predetermined duration which includes the initial error pulse. At the end of the counting interval, gate 38 causes an impulse to be produced by generator 39 as a readout pulse. The readout pulse is applied to translator 26 to cause an appropriate one of the decimal registers in the register bank 16 to be actuated for storing in a decimal counting system the total number of counting intervals during which the same number of error pulses occurred. The readout pulse from generator 39 also actuates generator 41 to cause the counters to be reset after the readout operation has been completed. The counting interval may be terminated upon the occurrence of the fifth error in any given interval by a pulse which is applied to gate 38 from the gate reset pulse amplifier 43. After a counting interval has been terminated the indicator remains inactive until a subsequent error pulse is detected by error detector 17.

If it is desired to count only the consecutive errors, armature 47 is operated into engagement with contact 49 to connect the consecutive error circuitry into the counting interval controlling circuits for terminating a counting interval upon the occurrence of an erroneous bit interval followed by a good bit interval. In this mode of operation, if registers I through V in bank 16 indicate 8, 9, 10, 7, 2, respectively, it is known that during the measuring period there were eight intervals comprising a single error, nine intervals comprising two consecutive errors, ten intervals comprising three consecutive errors, seven intervals comprising four consecutive errors, and two intervals comprising five consecutive errors. All of the previously described circuits of the indicator are operative and any given interval may be terminated (1) by the expiration of the predetermined counting interval as measured by gate 38 if such interval were no longer than the transmission time of five data bits, (2) by the occurrence of the fifth consecutive error in the interval as detected by the fifth error detector in translator 26, or (3) by the occurrence of an erroneous bit interval followed by a good bit interval as indicated by detector 50 and generator 51. In this mode of operation, single isolated error pulses could cause decimal register I to be actuated for indicating the occurrence of an event in which a single error has occurred. However, the arrangement of translator 26 may be readily modified, as will be evident from the description thereof in connection with FIG. 3, to actuate registers only in response to the occurrence of events which include more than one erroneous data bit.

Figure 3:
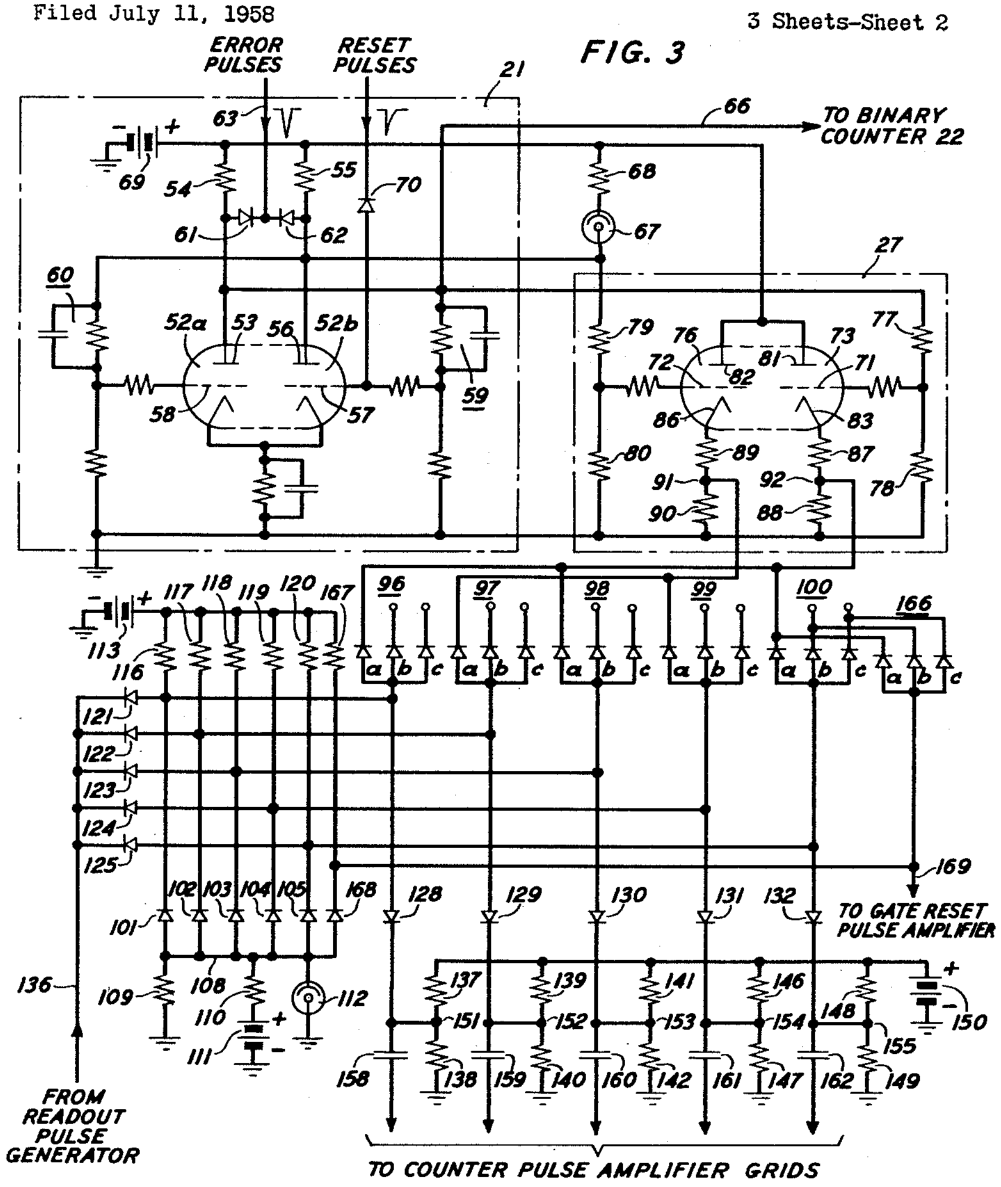
FIG. 3 is a schematic diagram of a representative portion of the binary counting circuits and of the translator of FIG. 2.

Referring to FIG. 3, there are illustrated the details of binary counter 21 together with the cathode follower circuit 27 and translator 26. Counters 22 and 23 and cathode followers 28 and 29 (none of which are illustrated in FIG. 3) are similar to counter 21 and cathode follower 27, respectively, and are connected to translator 26 in a similar manner as will be hereinafter discussed. Binary counter 21 is a bistable multivibrator which includes two triode discharge devices **52*a* and 52*b*. The anodes 53 and 56 thereof, respectively, are cross-coupled to the control grids 57 and 58 via the cross coupling time constant circuits 59 and 60**, respectively.

Error pulses from the output of error pulse amplifier 19 are applied via lead 63 to the multiple-connected cathodes of a pair of diodes 61 and 62 which have the anodes thereof connected to anodes 53 and 56, respectively. With this input connection arrangement the negative-going error pulses are coupled to the control grid of the conducting triode via the diode which is connected to the anode of the nonconducting triode. Each negative-going error pulse, therefore, causes the multivibrator to be transferred from one stable conducting condition to the other in a well known manner. Thus, the binary counter 21 is transferred back and forth between its One and Zero conditions by the negative-going error pulses which are applied thereto from error pulse amplifier 19 via the lead 63.

The output voltage variations at anode 53 are coupled via lead 66 to the next succeeding binary counter, counter 22. Thus the negative-going transitions at anode 53 cause binary counter 22 to be actuated back and forth between its One and its Zero conditions, and in a similar manner the negative-going transitions at one anode of binary counter 22 are coupled to binary counter 23 to actuate counter 23 back and forth between its One and Zero conditions.

A neon bulb 67 is connected in series with a resistor 68 between the positive terminal of battery 69 and anode 56 of counter 21. Since battery 69 supplies operating potential to anode 56, the bulb 67 is arranged to have sufficient potential difference impressed thereon when triode **52*b* is conducting to fire bulb 67. Thus, the bulbs 67** associated with each of the counters are lighted to provide a visual indication of the binary Zero condition of their respective counters.

Negative-going reset pulses are applied to control grid 57 of device **52*b* in each of the counters via a diode 70** for resetting all of the counters to the Zero binary condition, i.e. the zero count condition.

Voltage variations at anodes 53 and 56 are coupled to the control grids 71 and 72 of discharge triodes 73 and 76, respectively, in cathode follower 27. Anode load resistor 54 comprises with the series-connected resistors 77 and 78 a potential divider for controlling the potential at control grid 71 in response to the conducting condition of device **52*a*. Similarly, anode resistor 55 comprises with series-connected resistors 79 and 80 a potential divider for controlling the potential of control grid 72 in response to voltage variations at anode 56. Operating potential for triodes 73 and 76 is supplied from the positive terminal of battery 69 to anodes 81 and 82, respectively. Cathodes 83 and 86 are connected to the grounded negative terminal of battery 69 by the series-connected resistor combinations of resistors 87 and 88, and 89 and 90. Triodes 73 and 76 are normally conducting with the amount of conduction in each thereof controlled by the conducting condition of triodes 52*a* and 52*b***, respectively.

The output of cathode follower 27 is derived from a terminal 91 which is common to resistors 89 and 90 and a terminal 92 which is common to resistors 87 and 88. This output is coupled to the circuits of translator 26. Thus, cathode follower 27 comprises two cathode follower circuits. In general terms, the outputs of the $x$ binary counters are coupled to translator 26 by means of $2x$ cathode followers.

Translator 26 comprises five three-diode coincidence gates 96 through 100 which are arranged to control the operation of registers I through V, respectively. If binary counters 21, 22, and 23 are in their binary One, Zero, and Zero conditions, respectively, at the end of a counting interval, a pulse count of one in the decimal counting system is indicated. The counter output voltages bias gate 96 into coincidence, and register I is actuated in the manner hereinafter described.

The number of gates utilized is equal to the number $n$ of registers that are employed. Each of the gates 96 through 100 includes three diodes *a*, *b*, and *c*. Cathode follower output terminal 91 is connected in multiple to the cathodes of diodes *a* in gates 97 and 99. Cathode follower output terminal 92 is connected to the cathodes of diodes *a* in gates 96, 98, and 100. The cathodes of the diodes *b* and *c* in each gate are connected to the output terminals of the cathode followers 28 and 29 in a similar manner. The latter connections are not shown in FIG. 3 since they are similar to the connections that are shown and would only serve to complicate the drawing unnecessarily. The result of this connection arrangement is that each of the gates 96 through 100 is biased into its coincidence condition by the cathode follower output voltages in response to a different binary condition of the counters 21 through 23. Thus, gate 96 would be the only gate in coincidence in response to the binary count for one error pulse. Gate 97 would be the only gate in coincidence for the binary counter condition indicating two error pulses, and gate 100 is the only gate that would be in coincidence for the binary counter condition indicating five error pulses. The anodes of all diodes in each gate are connected in multiple. Thus, each gate has three, or $n$, input terminals which are the cathodes of the diodes thereof and one output terminal which is the multiple-connected anode connection thereof.

The multiple-connected anodes of gates 96 through 100 are connected, respectively, to the cathodes of voltage amplitude selecting diodes 101 through 105. The anodes of diodes 101 through 105 are connected in multiple to a first intermediate voltage bus 108. The potential of bus 108 is established by the connection thereof to an intermediate point on a potential divider comprising the resistors 109 and 110 which are connected in series between the terminals of a battery 111. The potential of bus 108 may be further stabilized by the connection of a voltage regulator tube 112 between bus 108 and the grounded negative terminal of battery 111. The potential of bus 108 may thus be established at some level such as, for example, 75 volts with respect to ground.

The multiple-connected anodes of gates 96 through 100 are also connected to the positive terminal of a battery 113 via resistors 116 through 120, respectively. The multiple-connected anodes of gates 96 through 100 are further connected, respectively, to the anodes of voltage amplitude selecting diodes 121 through 125 and to the anodes of voltage amplitude selecting diodes 128 through 132. The cathodes of diodes 121 through 125 are connected in multiple to the output of readout pulse generator 39 via a lead 136. The potential of lead 136, with respect to ground, may vary, for example, between +60 volts in the absence of a readout pulse and +200 volts during a readout pulse. Thus, it will be seen that in the absence of a readout pulse, diodes 121 through 125 are biased into conduction with a small component of current flowing therethrough from battery 113 via the resistors 116 through 120 and with another component of current flowing therethrough from bus 108 via diodes 101 through 105.

Any one of the gates 96 through 100 which is in the noncoincidence condition provides a voltage sink for bus 108 via the corresponding one of diodes 101 through 105 and the potential at the multiple-connected anodes of such gate remains at approximately the potential of bus 108. In a similar manner diodes 121–125 provide voltage sinks for bus 108 in the absence of a readout pulse.

Five potential dividers comprising the resistors 137–138, 139–140, 141–142, 146–147, and 148–149 are connected in shunt with one another between the terminals of a battery 150. These potential dividers are arranged so that the intermediate terminals 151 through 155 thereon are all at a second intermediate voltage which may be, for example, approximately +90 volts with respect to ground. The cathodes of diodes 128 through 132 are connected to terminals 151 through 155, respectively, and the same cathodes are also connected to the inputs of counter pulse amplifiers 30 through 34 via coupling capacitors 158 through 162, respectively.

A further three-diode coincidence gate 166 comprising diodes *a, b,* and *c* is bridged across gate 100 and comprises the fifth error detector circuit hereinbefore mentioned. The cathodes of diodes *a, b,* and *c* in gate 166 are connected respectively to the cathodes of diodes *a, b,* and *c* in gate 100. The anodes of the diodes in gate 166 are connected in multiple to the positive terminal of battery 113 via a resistor 167 and to the cathode of a voltage amplitude selecting diode 168 which has the anode thereof connected to bus 108. A lead 169 connects the multiple-connected anodes of gate 166 to the input of reset pulse amplifier 43.

Considering now the operation of the counting and translating circuits of FIG. 3, the counter multivibrator rests initially in its Zero condition with triode 52*a* conducting and triode 52*b* Off prior to the application of error pulses thereto. With triode 52*b* in its nonconducting condition there is insufficient potential drop across its load resistor 55 to bias neon bulb 67 into conduction. In this condition anode 53 is at a lower potential than anode 56; and accordingly, in cathode follower 27, triode 76 is conducting more heavily than triode 73. Cathode follower output terminal 91 is at a higher potential with respect to ground than output terminal 92.

The resistors 87 through 90 in cathode follower 27 are so designed with respect to the condition levels in triodes 73 and 76 that the relatively high potential at terminal 91 is sufficient to block the diodes *a* in gates 97 and 99. The relatively lower potential at terminal 92 is insufficient to block diodes *a* of gates 96, 98, and 100. The remaining diodes in gates 96 through 100 are biased in a similar manner from the output connections of cathode followers 28 and 29 so that at least one diode in each gate circuit is conducting prior to the application of a first error pulse to binary counter 21, and each gate is in its noncoincidence condition. As has been hereinbefore noted, diodes 101 through 105 and diodes 121 through 125 are all conducting. Diodes 128 through 132 are all blocked since their cathodes are all at the second intermediate voltage, 90 volts with respect to ground, and their cathodes are all at the first intermediate voltage, the 75-volt potential of bus 108 when diodes 101 through 105 are conducting.

The first error pulse which is applied to counter 21 via lead 63 triggers the multivibrator by coupling a negative pulse to grid 58 via diode 62 and cross coupling circuit 60. This pulse biases triode 52*a* Off thereby transferring conduction to triode 52*b* in a well known manner. The additional current drawn through load resistor 55 by triode 52*b* increases the potential drop thereacross by an amount which is sufficient to fire neon bulb 67. The transfer of conduction between triodes in counter 21 shifts the conduction levels in cathode follower 27 so that output terminal 92 is now at a relatively higher potential than is output terminal 91 thereby blocking diodes *a* in gates 96, 98, and 100. The potential at output terminal 91 is now at the relatively low level and unblocks diodes *a* in gates 97 and 99.

The blocking of diode *a* in gate 96 puts gate 96 in coincidence, and one of the voltage sinks which is available to bus 108 is removed. However, the voltage sink which is represented by diode 121 is still available and no output pulse is coupled to counter pulse amplifier 30 via diode 128 and capacitor 158. If a readout pulse is applied to lead 136 prior to the occurrence of a second error pulse, diodes 121 through 125 are all blocked, thereby removing both voltage sinks which are available to bus 108 via diode 101. The potential at the anode of diode 128 begins to rise thereby blocking diode 101, and current begins to flow from battery 113 through resistor 116, diode 128, and resistor 138 to ground. As the flow of current through resistor 138 increases, the potential of terminal 151 increases and a positive pulse is coupled via capacitor 158 to counter pulse amplifier 30 to actuate decimal register I.

If a readout pulse has not occurred prior to a second error pulse, that second error pulse triggers counter 21 once more thereby biasing triode 52*a* into conduction and coupling a negative-going voltage transition via lead 66 to trigger counter 22. The operation of the counters and cathode followers continues in response to each error pulse in a manner similar to that hereinbefore described. The second error pulse causes the coincidence condition to be shifted from gate 96 to gate 97 and each subsequent error pulse causes the coincidence condition to be shifted to the next succeeding gate. The application of a readout pulse to lead 136 at any stage in this operation causes the one of the diodes 128 through 132 which is associated with the gate in coincidence to be biased into conduction thereby coupling an output pulse to the associated counter pulse amplifier for actuating a corresponding decimal register.

If gate 100 is biased into coincidence prior to the application of a readout pulse to lead 136, gate 166 is also biased into coincidence. Since gate 166 is not connected to lead 136 it provides the only voltage sink for bus 108 via diode 168. Accordingly, with gate 166 in coincidence, the potential of the multiple-connected anodes thereof and the potential of lead 169 begin to rise as a result of the connection thereto of battery 113 via resistor 167. This increase in potential comprises a positive-going output pulse which is coupled via lead 169 to the gate reset pulse amplifier 43 of FIG. 2. The triggering of amplifier 43 in response to the pulse on lead 169 causes gate 38 to be actuated to terminate the counting interval and cause a readout pulse to be generated before the expiration of the timed duration of the counting interval. The readout pulse appears on lead 136 and blocks diodes 121 through 125. Since gate 100 is in coincidence and diode 125 is blocked by the readout pulse, the potential at the anode of diode 132 increases as a result of the connection thereof to battery 113 via resistor 120. The increase in potential biases diode 132 into conduction thereby producing a positive-going pulse at terminal 155, which pulse is coupled to counter pulse amplifier 34 and decimal register V via capacitor 162. The actuation of register V indicates the occurrence of an event in which five errors occurred during the counting interval.

Summarizing the operation of the counting and translating circuits of FIG. 1, which are partially illustrated in schematic form in FIG. 3, error pulses are counted in a binary counting system by counters 21 through 23. Each counter has two outputs of opposite phase with respect to one another as is well known for bistable multivibrators. Each output then comprises a binary signal voltage wave, and the combined binary conditions of such waves at any one time comprises the binary code representation of the number of error pulses counted up to that time. Each successive count which is indicated by counters 21 through 23 biases a different one of the coincidence gates 96 through 100 in FIG. 3 into coincidence with all three diodes of such gate being blocked. The application of a readout pulse to lead 136 causes the one of the diodes 128 through 132, which is associated with the one gate in coincidence, to be biased ON thereby producing an output pulse which is coupled to the corresponding counter pulse amplifier to actuate the corresponding decimal register. In this manner the binary counts in counters 21 through 23 are converted to decimal counts, and the decimal counts are stored in decimal registers I through V by actuating those registers to total separately the numbers of counting intervals during which different numbers of error pulses occurred. Stated in another way, the binary counts of the number of error pulses which occur during each one of a series of successive counting intervals are separated, or classified, according to the magnitude of the count and stored in separate count storing means.

Figures 4, 5:
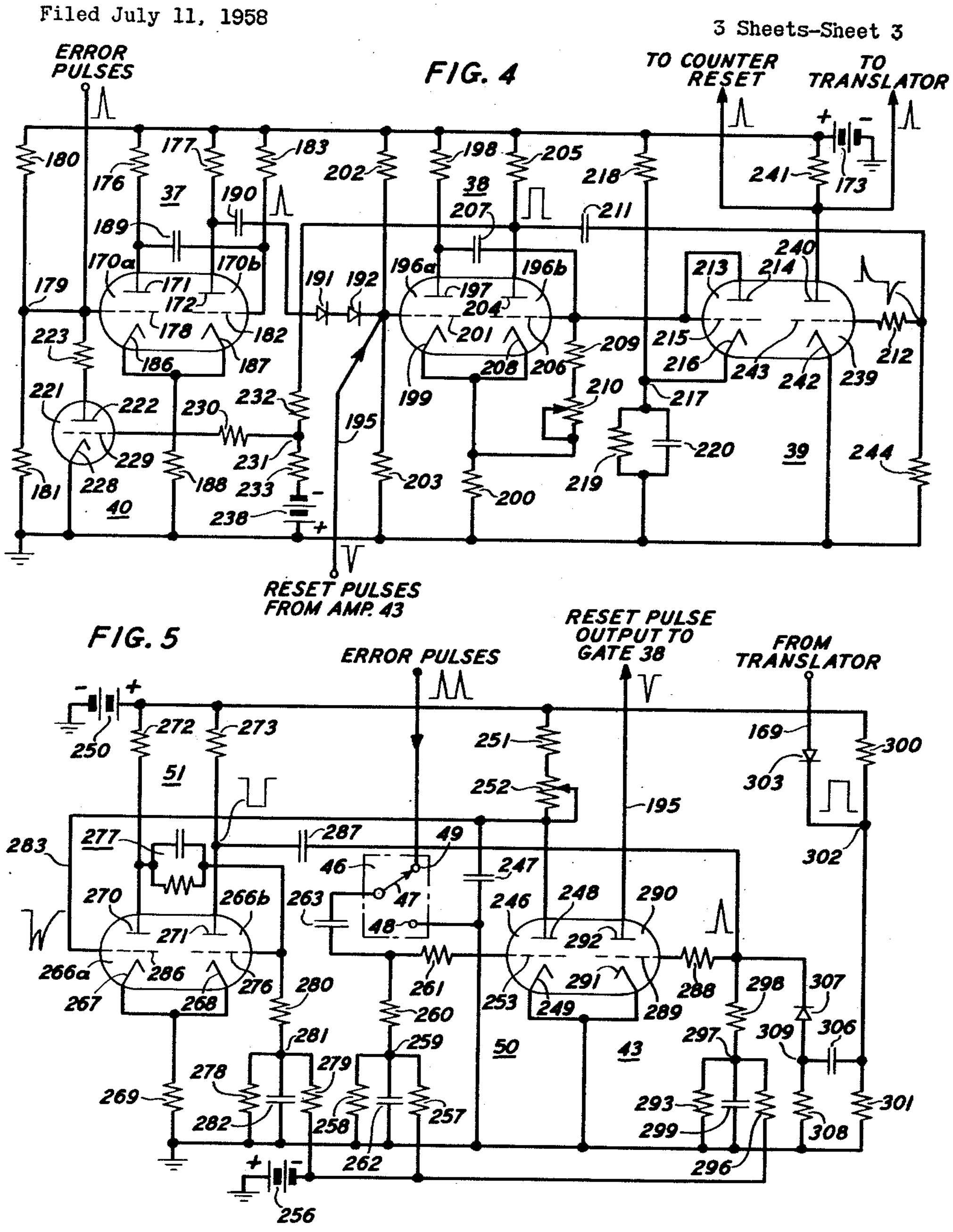
FIG. 4 is a schematic diagram of the timing portions of the counting interval controlling circuits of FIGS. 1 and 2.
FIG. 5 is a schematic diagram of the consecutive pulse responsive portions of the counting interval control circuits.

Referring to FIG. 4, the timing portion of counting interval controller 12 is illustrated in detail together with the detail of readout pulse generator 39. Start pulse generator 37 comprises a pair of discharge triodes 170*a* and 170*b* connected as a monostable multivibrator with positive grid return. The anodes 171 and 172 are connected to the positive terminal of a battery 173 by means of load resistors 176 and 177, respectively. The normal bias on the control grid 178 is established by the connection thereof to an intermediate terminal 179 on a potential divider which comprises the resistors 180 and 181 connected in series between the terminals of battery 173. Control grid 182 is connected to the positive terminal of battery 173 via resistor 183. Cathodes 186 and 187 are connected together and both cathodes are connected to the grounded negative terminal of battery 173 via the common cathode resistor 188.

Anode 171 is cross-coupled to control grid 182 by capacitor 189. The output of generator 37 is coupled from anode 172 to the input of counting interval gate 38 by means of a capacitor 190 which is connected in series with a pair of diodes 191 and 192. The time constant of the cross-coupling capacitor 189 and positive grid return resistor 183 is very short, and the multivibrator is in its unstable condition for a very short time. Start pulse generator 37 produces a positive-going output pulse of short duration in response to each error pulse which is applied to control grid 178.

Counting interval gate 38 comprises two discharge triodes 196*a* and 196*b* which are also arranged as a monostable multivibrator. Triode 196*a* comprises an anode 197 which is connected to the positive terminal of battery 173 via a load resistor 198, a cathode 199 which is connected to ground via a resistor 200, and a control grid 201 which has the normal operating potential thereof established by a potential divider which includes resistors 202 and 203 connected in series between the terminals of battery 173. Triode 196*b* comprises an anode 204 which is connected to the positive terminal of battery 173 via load resistor 205, a control grid 206 which is cross coupled to anode 197 via capaictor 207, and a cathode 208 which is connected directly to cathode 199. Control grid 206 is returned to ground by means of a series-connected resistance combination comprising resistor 209, rheostat 210, and cathode resistor 200. The time constant of capacitor 207 and the above-mentioned series-connected resistance combination is relatively long so that counting interval gate 38 remains in its unstable condition after the triggering thereof for a predetermined number of bit intervals which comprise the predetermined counting interval. The pulse distribution indicator which is illustrated in FIG. 2 with five decimal registers may have a counting interval of about fifteen to twenty bit intervals. The duration of the counting interval may be regulated by adjusting rheostat 210 to change the duty cycle of gate 38. Rheostat 210 is part of the On-time charging current path for the capacity 207 which cross-couples anode 197 to control grid 206, and the adjustment of rheostat 210 changes the time constant of the On-time cross-coupling circuit of gate 38.

Input pulses to counting interval gate 38 are coupled to control grid 201 from generator 37 via capacitor 190 and the diodes 191 and 192. Diodes 191 and 192 are included in the coupling circuit to prevent negative-going voltage transitions at anode 172 from affecting the operation of gate 38. A lead 195 is also connected to control grid 201 for applying reset pulses thereto from gate reset pulse amplifier 43. The output of gate 38 is coupled from anode 204 to the readout pulse generator 39 by means of a coupling capacitor 211 and a grid current limiting resistor 212.

A diode discharger is provided for capacitor 207 to facilitate the rapid restoration of the charge thereon to its normal level following the transfer of gate 38 from its unstable to its stable condition at the end of a counting interval. The diode discharger comprises a diode-connected triode 213 having the anode 214 thereof connected to control grid 206. Triode 213 is also provided with a control grid 215 and a cathode 216 which are connected to an intermediate terminal 217 on a potential divider comprising resistors 218 and 219 connected in series between the terminals of battery 173. An alternating current by-pass capacitor 220 is connected in parallel with resistor 219 to by-pass transient voltage variations so that the bias condition of cathode 216 will not be seriously affected by transient voltages at anode 197. Potential divider 218–219 is designed so that when gate 38 is in its stable conducting condition cathode 216 is at a slightly lower potential than anode 214. Thus, triode 213 is normally conducting when gate 38 is in its stable condition.

Since error pulses will occur during the counting interval when gate 38 is in its unstable condition, it is necessary to prevent the application of such pulses to control grid 201. Input pulses applied to grid 201 while gate 38 is in its unstable condition affect the conduction level of triode 196*a* and thereby change the charge on capacitor 207. Such changes in the charge on capacitor 207 will of course affect the timing of the output pulse from gate 38 in a well known manner. Accordingly, error pulse suppressor 40 is provided to suppress error pulses at control grid 178 while gate 38 is in its unstable condition. Pulse suppressor 40 comprises a triode 221 having the anode 222 thereof connected to control grid 178 via a resistor 223. Cathode 228 is connected directly to ground, and control grid 229 is connected via resistor 230 to a terminal 231 on a potential divider comprising resistors 232 and 233 connected in series between anode 204 and the negative terminal of a battery 238. The positive terminal of battery 238 is connected to ground.

The resistance of resistor 223 is made much smaller than the resistance of resistor 180. When triode 221 is conducting it reduces the direct potential level at grid 178 to a level which is so much lower than the level otherwise established by resistors 180 and 181 that the amplitude of error pulses on control grid 178 is insufficient to trigger start pulse generator 37. Control grid 229 is normally negatively biased by battery 238 when gate 38 is in its stable conducting condition. Thus triode 221 is normally non-conducting when gate 38 is in its stable conducting condition. When gate 38 is transferred to its unstable conducting condition, the potential at anode 204 increases sufficiently to bias control grid 229 positively with respect to ground thereby biasing triode 221 into conduction.

Readout pulse generator 39 comprises a saturation clipper circuit and a differentiating circuit. The clipper comprises a triode 239 having the anode 240 thereof connected to the positive terminal of battery 173 by means of a load resistor 241. The cathode 242 of triode 239 is connected directly to ground. Control grid 243 is returned to ground via resistor 212 and a resistor 244. Triode 239 is normally conducting at approximately its maximum, or saturated, conduction level. The differentiating circuit comprises coupling capacitor 211 and resistor 244 which differentiate the rectangular positive-going output pulse of gate 38 thereby causing successive positive and negative impulses to be applied to control grid 243 in response to the leading and trailing edges, respectively, of the gate 38 output pulse. Since triode 239 is normally conducting at the saturation level, the positive pulse on grid 243 has substantially no affect on the conduction thereof. However, the negative pulse on control grid 243 reduces the conduction level in triode 239 thereby producing a positive-going pulse at anode 240. This positive-going pulse is the readout pulse hereinbefore mentioned, and it is applied to counter reset pulse generator 41 and to translator 25 as described in connection with FIG. 2.

The operation of the circuit of FIG. 4 as a whole will now be described. In the normal operating condition of the circuit, before the application of an error pulse thereto, generator 37 is in its stable conducting condition with triode 170*a* Off and triode 170*b* On; gate 38 is in its stable conducting condition with triode 196*a* Off and triode 196*b* On; error pulse suppressor triode 221 is Off; triode 213 is On; and triode 239 is On at the saturation conduction level. The application of an error pulse to control grid 178 triggers start pulse generator 37 into its unstable conducting condition in a well known manner with triode 170*a* On and triode 170*b* Off. The positive-going pulse at anode 172 triggers counting interval gate 38 into its unstable conducting condition in a well known manner with triode 196*a* On and triode 196*b* Off. Almost immediately after the triggering of gate 38, generator 37 returns to its stable conducting condition with triode 170*a* Off and triode 170*b* On. The positive-going potential at anode 204 of triode 196*b* biases suppressor triode 221 into conduction thereby clamping the potential at control grid 178 at a level such that subsequent error pulses will be unable to trigger generator 37. The positive-going voltage transition at anode 204 is also coupled to control grid 243 in readout pulse generator 39 but has no affect thereon since triode 239 is already conducting at the saturation level.

The triggering of triode 196*a* into conduction causes a negative-going voltage to appear at anode 197, and this voltage is coupled to control grid 206 via capacitor 207. The negative-going voltage is also coupled to anode 214 from control grid 206 and is of sufficient magnitude to reduce the potential at anode 214 to a level which is below the potential level of cathode 216 thereby blocking conduction in triode 213. Gate 38 continues to operate in its unstable condition for its natural cycle until the potential at control grid 206 rises to a level which is sufficient to permit triode 196*b* to conduct once more. At that time, gate 38 is restored to its stable conducting condition with triode 196*a* Off and triode 196*b* On. The increase in potential at anode 197 is coupled to anode 214 via capacitor 207 thereby biasing triode 213 into conduction and providing a relatively low impedance discharge path for capacitor 207 to enable the charge thereon to be restored to approximately the normal level for stable operation of gate 38 in a time which is equal to a small fraction of a bit interval. Thus gate 38 is restored rapidly to its normal stable operating condition so that it may be responsive to an error pulse in the bit interval following the termination of the counting interval.

The negative-going voltage transition at anode 204 of gate 38 biases suppressor triode 221 Off once more thereby readying start pulse generator 37 to be responsive to the application of error pulses thereto. The negative-going voltage transition is also applied to control grid 243 of readout pulse generator 39 thereby causing a positive-going readout pulse to appear at the anode 240.

The counting interval can be terminated prior to the expiration of the natural period of gate 38 by the application of a negative-going reset pulse to control grid 201 from gate reset pulse amplifier 43 via lead 195. The reset pulses are of sufficient amplitude to reduce the conduction level in triode 196*a* thereby overriding the bias on grid 206, transferring conduction back to triode 196*b*, and restoring gate 38 to its stable condition.

Referring to FIG. 5, the consecutive error circuitry illustrated there comprises the details of consecutive error detector 50, consecutive error reset pulse generator 51, and gate reset pulse amplifier 43.

Consecutive error detector 50 comprises a triode 246 having a capacitor 247 connected between the anode 248 and the cathode 249 thereof to form a saw-tooth voltage wave generator. Cathode 249 is connected directly to ground and anode 248 is connected to the positive terminal of a battery 250 via a resistor 251 and a rheostat 252 which are connected in series.

Bias potential for control grid 253 is provided from a battery 256 and a potential divider comprising the resistors 257 and 258 which are connected in series between the terminals of battery 256. A terminal 259 which is common to resistors 257 and 258 is connected to grid 253 via the series-connected resistors 260 and 261. An alternating current by-pass capacitor 262 is connected between terminal 259 and ground. Positive-going error pulses from the output of cathode follower 20 are applied to control grid 253 via contact 49, armature 47, a coupling capacitor 263, and resistor 261.

The output of consecutive error detector 50 is applied from anode 248 to the consecutive error reset pulse generator 51. Generator 51 is a bistable multivibrator comprising the triodes 266*a* and 266*b*. The cathodes 267 and 268 of these triodes are both connected to the grounded negative terminal of battery 250 via the common cathode resistor 269. Anodes 270 and 271 of these triodes are connected to the positive terminal of battery 250 via the anode load resistors 272 and 273, respectively. Anode 270 is cross-coupled to control grid 276 by means of a parallel-connected resistance-capacitance circuit 277. Grid 276 is biased by means of a potential divider comprising the resistors 278 and 279 which are connected in series between the terminals of battery 256. Grid 276 is connected via a resistor 280 to a terminal 281 which is common to resistors 278 and 279. An alternating current by-pass capacitor 282 is connected between terminal 281 and ground.

Triggering pulses are applied to generator 51 by a lead 283 which connects anode 248 to control grid 286 of triode 266*a*. The bias potentials on grid 286 vary between a high and low value under the control of the potential at anode 248 in detector 50. The high potential tends to bias triode 266*a* into conduction to place generator 51 in its first stable conducting condition, and the low potential tends to bias triode 266*a* Off thereby setting generator 51 in its second table conduction condition.

The output of generator 51 is coupled from anode 271 thereof via capacitor 287 and a resistor 288 to a control grid 289 of triode 290 in the reset pulse amplifier 43. Cathode 291 of triode 290 is connected directly to ground and the anode 292 of triode 290 is connected to counting interval gate 38 by means of lead 195. Anode potential for triode 290 is supplied via lead 195 and resistor 202 in FIG. 4. The bias potential of grid 289 is established by means of a potential divider which includes the resistors 293 and 296 connected in series between the terminals of battery 256 and having an intermedite terminal 297 thereon connected to control grid 289 via resistor 288 and a resistor 298. An alternating current by-pass capacitor 299 is connected between terminal 297 and ground. Triode 290 is normally biased Off by the potential divider 293–296 in the absence of a positive-going pulse on grid 289. Capacitor 287 and resistor 298 comprise a differentiating circuit for differentiating the negative-going output pulses from anode 271 in generator 51. The leading edge of the negative-going rectangular pulse from generator 51 produces no change in the conducting condition of triode 290 which is normally non-conducting. However, the positive-going trailing edge thereof produces a positive impulse on grid 289 which results in a negative-going voltage pulse, the reset pulse, at anode 292.

Another source of input signals for reset pulse amplifier 43 is provided by connections to control grid 289 from translator 26. A potential divider comprising the resistors 300 and 301 and a common terminal 302 therefor is connected in series between the terminals of battery 250. Voltage signals from the fifth word detector gate 166 in translator 26 in FIG. 3 are applied to control grid 289 via a diode 303, terminal 302, a coupling capacitor 306, diode 307, and resistor 288 connected in series therebetween in the order named. A resistor 308 is connected between ground and a terminal 309 which is common to diode 307 and capacitor 306.

Diode 303 and the potential divider 300–301 isolate amplifier 43 from translator 26. The voltage signals applied to diode 303 comprise positive-going rectangular pulses having a duration which corresponds to the time interval which elapses between the time that gate 166 in translator 26 is biased into coincidence and the time that counter reset pulse generator 41 causes binary counters 21 through 23 to be reset to the Zero condition thereby restoring gate 166 to the noncoincidence condition. The last-mentioned positive-going rectangular pulse is differentiated by capacitor 306 and resistor 308, and the positive-going impulse resulting from the differentiation of the leading edge thereof is applied via diode 307 and resistor 288 to control grid 289 to initiate the generation of the reset pulse as hereinbefore described. The application of the negative-going pulse which results from the differentiation of the trailing edge of the rectangular pulse from gate 166 is blocked by diode 307 and does not reach amplifier 43.

The operation of the consecutive error circuitry is initiated by setting armature 47 of switch 46 in contacting engagement with contact 49 as illustrated. Triode 246 is normally biased Off by potential divider 257–258, and capacitor 247 is charged to a potential which is equal to the terminal voltage of battery 250. Generator 51 rests in its first stable condition with triode 266a conducting and triode 266b nonconducting. Triode 290 of reset amplifier 43 is based Off as hereinbefore noted.

Error pulses from cathode follower 20 are now coupled to control grid 253 via armature 47, capacitor 263, and resistor 261. Each error pulse is of sufficient magnitude to bias triode 246 into conduction thereby providing a low impedance discharge path for capacitor 247. Capacitor 247 discharges to ground potential through triode 246 during the brief conduction interval thereof. Upon the termination of each pair of pulse, triode 246 returns to its nonconducting condition and capacitor 247 charges via resistor 251 and rheostat 252 toward the terminal voltage of battery 250. The time constant of this charging path may be regulated by adjustment of rheostat 252 and should be set so that capacitor 247 will be restored very nearly to its quiescent charge within approximately 1¼ bit intervals.

The drop in potential at anode 248 upon the triggering of triode 246 is coupled to control grid 286 in generator 51 via lead 283 to bias triode 266*a* Off and trigger generator 51 into its second stable conducting condition with triode 266*b* conducting. Upon the triggering of triode 266*a* Off, the increase in potential at anode 270 is coupled to control grid 276 for biasing triode 266*b* into conduction thereby initiating a negative-going voltage pulse at anode 271 in a well known manner. In addition, the potential drop across resistor 269, as a result of the current flowing in triode 266*b*, also tends to bias triode 266*a* Off.

Upon the occurrence of a second consecutive error pulse, triode 246 is once more triggered into conduction thereby discharging capacitor 247 and dropping the potential of control grid 286 back to ground potential. This operation takes place before the charge on capacitor 247 has risen sufficiently to bias triode 266*a* On and is illustrated by the waveform adjacent lead 283. The operation continues until a bit interval with no error pulse occurs. Thus, capacitor 247 and triode 246 co-operate to detect the occurrence of consecutive error pulses and to hold generator 51 in its second stable conducting condition for the duration of a consecutive error pulse train. When a bit interval with no error pulse occurs, capacitor 247 charges to its maximum potential thereby increasing the potential on grid 286 sufficiently to cause conduction in triode 266*a*. Generator 51 is restored to its first stable condition, and the negative-going output pulse at anode 271 is terminated. Thus, the total duration of the output pulse from generator 51 is substantially the same as the duration of the consecutive error pulse train. The termination of the negative-going pulse causes a positive-going impulse to be applied to control grid 289 of reset pulse amplifier 43 as hereinbefore described thereby applying a reset pulse via lead 195 to gate 38.

Error detector 50 and generator 51 are not affected by reset or readout pulses. Accordingly, these two circuits continue their examination of any train of consecutive error pulses regardless of counting interval duration, and they generate a pulse for triggering amplifier 43 in response to a bit interval which includes an error pulse followed by a bit interval which does not include an error pulse.

Summarizing the operation of the pulse distribution indicator described herein, all error pulses occurring during a given period of time are counted by examining time intervals of predetermined maximum duration including a first error pulse. The number of pulses occurring during each such interval is counted in a binary counting system, translated into an equivalent decimal count at the end of the interval, and stored in an appropriate one of a plurality of decimal registers. The storage of decimal counts is accomplished by totalling separately the number of counting intervals having different total numbers of error pulses. Each counting interval is timed to have a predetermined maximum duration, but it may be terminated sooner in response to the counting of a predetermined maximum number of errors or in response to the occurrence of an erroneous bit interval followed by a bit interval which includes no error pulse.

Although this invention has been described in connection with a particular embodiment thereof, it is to be understood that additional embodiments thereof which will be obvious to those skilled in the art are included within the spirit and scope of the appended claims.

What is claimed is:

1. A circuit for registering pulse occurrence patterns in a train of pulses during time intervals of predetermined duration, each of said time intervals comprising at least one period during which a pulse may or may not occur, said circuit comprising means for counting at least $n$ pulses, said counting means generating a different electric signal for each pulse counted thereby during an interval, means for applying pulses to said counting means, $n$ registers responsive to said different electric signals for totalling interval pulse counts, counting interval control means responsive to one of said pulses for generating an output voltage wave having a duration corresponding to said predetermined duration, means connected to the output of said control means for generating a readout pulse in response to the termination of said wave, coupling means responsive to said readout pulse for applying each of said electrical signals to one only of said $n$ registers thereby separately totalling the numbers of said interval pulse counts of different magnitudes, means responsive to said readout pulse for resetting said counting means to zero, means connected to said counting means for initiating the generation of said readout pulse in response to the counting of a predetermined number of said pulses during one of said intervals, means for detecting consecutive pulses, and means for connecting the last-mentioned means to said control means for initiating the generation of said readout pulse in response to a pulse followed consecutively by a period in which a pulse does not occur.

2. In a pulse distribution indicator a source of pulses, means for counting the number pulses occurring in counting intervals of controllable duration, means applying said pulses to said counting means, counting interval controlling means responsive initially to the first pulse in each of said intervals for generating a readout pulse at the end of each of said intervals, means connecting the output of said pulse source to the input of said controlling means, $n$ count indicating means, means for connecting said count indicating means to said counting means, and means applying said readout pulse to the last-mentioned connecting means for actuating a different one of said count indicating means for each different total number of pulses counted during said intervals.

3. A random pulse distribution indicator comprising a source of random pulses, means connected to said source for counting said random pulses, a circuit connected to said source and responsive to a first random pulse for controlling the duration of an interval during which said first pulse and subsequently occurring random pulses are to be counted, said circuit producing a readout pulse in the output thereof upon the termination of said interval, $n$ count registers, means responsive to said readout pulse and to pulse counts of different magnitudes in said counting means for actuating different ones of said registers, respectively, and means in said actuating means responsive to the counting of a predetermined number of random pulses for triggering said control circuit to produce said readout pulse.

4. In a random pulse distribution indicator a source of random pulses, means connected to said source for counting the number of said random pulses which occur during separate time intervals, said counting means producing a different electric signal in response to each pulse counted during one of said intervals, a circuit connected to said source and responsive to a first random pulse from said source for controlling the duration of said intervals and for producing an output pulse at the termination of each of said intervals, a plurality of count registers, pulse responsive means for coupling each of said different signals to a different one of said registers, respectively, means for applying said output pulse to said coupling means, and means in said circuit for triggering said circuit to generate said output pulse in the absence of consecutive random pulses.

5. A random pulse distribution indicator comprising a source of random pulses, means connected to said source for counting the number of said random pulses occurring during each of a plurality of time intervals, said counting means comprising a plurality of binary counter stages connected for actuation in sequence to produce a plurality of binary voltage signals representing the binary count of said random pulses, a control circuit connected to said source and responsive to a first one of said random pulses for regulating the duration of said intervals, said control circuit including means for producing an output pulse in response to the termination of each of said intervals, means connected to said control circuit and responsive to said output pulse for generating a readout pulse, a plurality of decimal registers, a binary-to-decimal translator coupled between said counter stages and said registers, means applying said readout pulse to said translator, and said translator being responsive to said readout pulse and to said binary voltage signals for actuating a different one only of said registers for different binary count.

6. In a random pulse distribution indicator, $x$ binary counter stages for counting said pulses, each of said stages comprising a bistable multivibrator having one input terminal and two output connections, means for applying random pulses to said input terminals to actuate said counters in sequence in a binary manner thereby producing binary voltage waves of opposite phase in the two output connections of each of said stages, $n$ coincidence gates each having $x$ input terminals and one output terminal, $n$ decimal registers, means for connecting each of said gate input terminals to one of said counter output terminals for biasing one only of said gates into coincidence for each different combination of binary conditions of said voltage waves, a source of counter readout pulses, and means responsive to the coincidence condition in said one gate and to one of said readout pulses for coupling said one gate to a corresponding one of said registers.

7. The random pulse distribution indicator in accordance with claim 6 in which said coincidence responsive coupling means comprises a source of potential and individual coupling means connected to the output terminal of each of said gates, said individual coupling means comprising first amplitude selecting means for connecting said source of readout pulses to the output terminal of said each gate, said readout pulse source biasing said first amplitude selecting means for conduction in the absence of a readout pulse, second amplitude selecting means for connecting said potential source to the output terminal of said each gate, said second amplitude selecting means being biased for conduction in response to noncoincidence of said each gate or in response to conduction in said first amplitude selecting means, said second amplitude selecting means being biased for nonconduction in response to coincidence of said each gate and nonconduction of said first amplitude selecting means, third amplitude selecting means for connecting the output terminal of said each gate to its corresponding register, and bias means connected to said second and third amplitude selecting means for basing said third amplitude selecting means into conduction in the absence of conduction in said second amplitude selecting means.

8. The random pulse ditsribution indicator in accordance with claim 6 in which the $n$th one of said coincidence gate comprises means for triggering said readout pulse source for producing a readout pulse to actuate said coupling means in response to coincidence in said $n$th gate.

9. In a random pulse distribution indicator, $x$ binary counter stages for counting the number of random pulses occurring in controllable time intervals, each of said stages comprising a bistable multivibrator having one input terminal and two output connections, means for applying random pulses to said input terminals to actuate said counters in sequence in a binary manner, 2x cathode follower circuits, means for connecting the input of each of said cathode follower circuits to a different one of said counter output connections, $n$ decimal registers, a binary-to-decimal count translator for coupling the output of said cathode follower circuits to said decimal registers, said translator comprising $n$ coincidence gates having $x$ input terminals and one output terminal, means for connecting each of said $x$ input terminals to the output of one said cathode follower circuits to bias a different one of said $n$ gates into coincidence in response to each different binary count thereby producing a voltage output signal in said one gate, means for connecting each of said gate output terminals to a different one of said decimal registers, and interval control means connected to said gate output terminals in multiple and responsive to one of said random pulses for triggering said one gate at the end of each of said intervals to cause said voltage signal to actuate a corresponding decimal register.

10. The random pulse distribution indicator in accordance with claim 9 which comprises in addition a reset pulse generator, means for connecting the output of said interval controlling means to the input of said reset pulse generator for generating a reset pulse in response to the termination of each of said intervals, and means for applying said reset pulse to said binary counters for resetting said counters to the zero count condition.

11. A random pulse distribution indicator for detecting the occurrence of random pulses in time intervals which comprise recurring time periods, said indicator comprising a source of random pulses, means connected to said source for counting the random pulses occurring in each of said intervals, means for registering the random pulse count at the end of each of said intervals, means responsive to a readout pulse for coupling said counting means to said registering means, a monostable saw-tooth wave generator having a natural period of oscillation greater than the duration of one of said periods, means for applying random pulses to said saw-tooth generator for initiating a cycle of oscillation, a bistable multivibrator, means for connecting the output of said saw-tooth generator to the input of said multivibrator for triggering said multivibrator into a first conducting condition in response to the initiation of said cycle and into a second conducting conditon in response to a predetermined portion of the saw-tooth wave occurring more than one of said time periods after said initiation, and means responsive to the triggering of said multivibrator into said second condition for applying a readout pulse to said coupling means.

12. In a random pulse distribution indicator for detecting the occurrence of random pulses in successive time periods making up controllable time intervals, means for generating a control pulse in response to the occurrence of a first one of said time periods which includes a random pulse followed consecutively by a second one of said time periods which does not include a random pulse, the last-mentioned means comprising a monostable saw-tooth oscillator having a natural period of oscillation which is greater than the duration of one of said periods, means for applying said random pulses to said oscillator for initiating a cycle of oscillation, a bistable multivibrator having an input terminal connected to the output of said oscillator for triggering said multivibrator to a first stable condition in response to the initiation of said cycle and to a second stable condition in response to a subsequent portion of said cycle, and means for deriving said control pulse from said multivibrator in response to the triggering thereof to said second stable condition.

13. A random pulse distribution indicator for detecting the occurrence of random pulses in successive time periods making up controllable time intervals, said indicator comprising means for counting the random pulses occurring in each interval, means for registering the count at the end of each interval in response to a readout pulse, means for controlling the duration of said intervals comprising a first trigger circuit for generating a sharp impulse in response to the application of a trigger pulse thereto, means for applying said random pulses to said first trigger circuit, a second trigger circuit for generating a rectangular pulse in response to said impulse, the duration of said rectangular pulse corresponding to the duration of one of said intervals, means for applying said impulses to actuate said second trigger circuit, means responsive to said rectangular pulse for suppressing random pulses in the input to said first trigger circuit for the duration of said rectangular pulse, means responsive to the termination of said rectangular pulse for actuating said counting means to readout to said register means, a monostable saw-tooth wave oscillator having a natural period greater than the duration of one of said time periods, means for applying said random pulses to said oscillator for initiating a cycle in said saw-tooth wave, a bistable multivibrator having an input terminal connected to said oscillator for triggering said multivibrator into a first one of its stable conditions in response to the initiation of said saw-tooth wave, a predetermined potential level in said saw-tooth wave triggering said multivibrator into a second one of its stable conditions, means for deriving a pulse from said multivibrator in response to the triggering thereof to said second stable condition, and means responsive to the last-mentioned pulse for biasing said second trigger circuit to terminate said rectangular pulse.

14. A circuit for translating the binary representation of a number into the decimal representation thereof, said circuit comprising a source of $2n$ binary signal voltage waves, the combined binary conditions of said waves at any one time comprising the binary code representation of a number, a plurality of decimal count indicating means and a corresponding plurality of coincidence gates, each of said gates having $n$ input connections and one output connection, means connecting said $2n$ signal voltage waves to said gate input terminals for biasing a different one only of said gates into coincidence while at the same time biasing the remainder of said gates into noncoincidence in response to each of said combined binary conditions of said signal voltage waves, and means for coupling the output of said one gate to its corresponding decimal count indicating means.

15. The translating circuit in accordance with claim 14 in which said coupling means comprises a source of trigger pulses, a source of potential, and individual coupling means connected to the output terminal of each of said gates, said individual coupling means comprising first amplitude selecting means for connecting said source of trigger pulses to the output terminal of said each gate, said trigger pulse source biasing said first amplitude selecting means for conduction in the absence of a trigger pulse, second amplitude selecting means for connecting said potential source to the output terminal of said each gate, said second amplitude selecting means being biased for conduction in response to noncoincidence of said each gate or in response to conduction in said first amplitude selecting means, said second amplitude selecting means being biased for non conduction in response to coincidence of said each gate and nonconduction of said first amplitude selecting means, third amplitude selecting means for connecting the output terminal of said each gate to its corresponding decimal count indicating means, and bias means connected to said second and third amplitude selecting means for biasing said third amplitude selecting means into conduction in the absence of conduction in said second amplitude selecting means.

References Cited in the file of this patent

UNITED STATES PATENTS

| | | |
|---|---|---|
| 2,425,315 | Atwood et al. | Aug. 12, 1947 |
| 2,793,344 | Reynolds | May 21, 1957 |
| 2,850,718 | Davison et al. | Sept. 2, 1958 |
| 2,947,971 | Glauberman | Aug. 2, 1960 |
| 2,950,459 | Loper | Aug. 23, 1960 |